(12) United States Patent
Kärger et al.

(10) Patent No.: US 6,471,626 B1
(45) Date of Patent: Oct. 29, 2002

(54) RESILIENT ROLL FOR SMOOTHING WEBS

(75) Inventors: Jens Christian Kärger, Winterthur (CH); Albert Maria Vodermayer, Dietlikon (CH)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/583,727

(22) Filed: May 31, 2000

(30) Foreign Application Priority Data

Jun. 2, 1999 (DE) .......................................... 199 25 419

(51) Int. Cl.[7] .................................................. B23P 15/00
(52) U.S. Cl. ............................................. 492/50; 492/54
(58) Field of Search .......................... 29/855; 492/56, 492/59, 50; 226/190, 194

(56) References Cited

U.S. PATENT DOCUMENTS

| 5,153,660 | A | * | 10/1992 | Goto ........................... 355/285 |
| 5,431,321 | A | * | 7/1995 | Iink et al. .................... 226/194 |
| 5,741,616 | A | * | 4/1998 | Hirano et al. ................. 492/56 |
| 5,792,533 | A | * | 8/1998 | Kurokawa et al. .......... 428/36.9 |
| 5,908,680 | A | * | 6/1999 | Moren et al. ............... 428/40.1 |

FOREIGN PATENT DOCUMENTS

| DE | 3937246 | 5/1990 |
| DE | 4035054 | 5/1992 |
| DE | 4126232 | 11/1992 |
| DE | 9314568.3 | 3/1995 |
| DE | 29722778 | 5/1998 |

OTHER PUBLICATIONS

Conti Print–Mäntel für NIPCO Presseure der Fa. Continental AG, Hannover, 1989, WT2325.9.89(Pi).

* cited by examiner

*Primary Examiner*—I. Cuda-Rosenbaum
(74) *Attorney, Agent, or Firm*—Greenblum & Bernstein P.L.C.

(57) ABSTRACT

Roll and process of producing roll that includes hard roll core, a resilient covering layer located on an outer side of said hard roll core, and a metallic top layer located on an outside of said resilient covering layer. The metallic top layer includes fibers that include at least one of metal fibers and metal-coated fibers. The process includes applying a resilient covering layer onto an outer side of the hard roll core, and winding a metallic top layer comprising a plurality of fibers of at least one of metal fibers and metal-coated fibers onto an outside of the resilient covering layer.

33 Claims, 2 Drawing Sheets

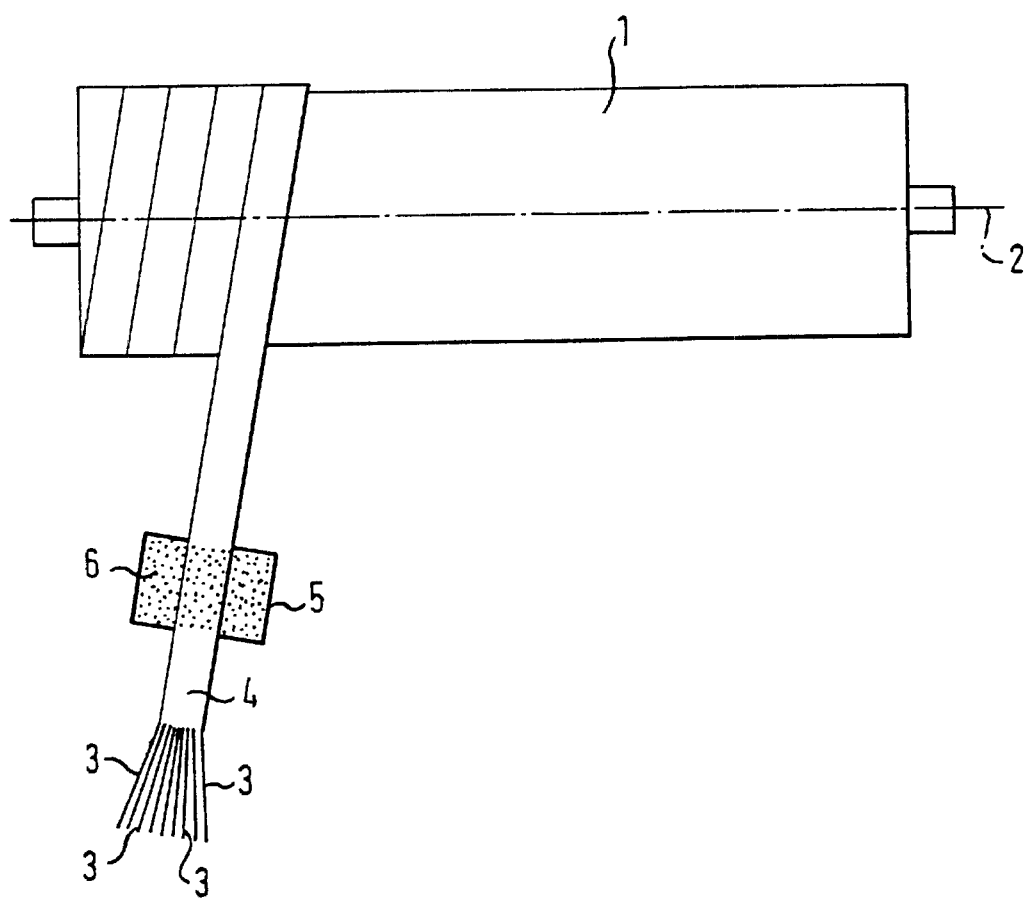

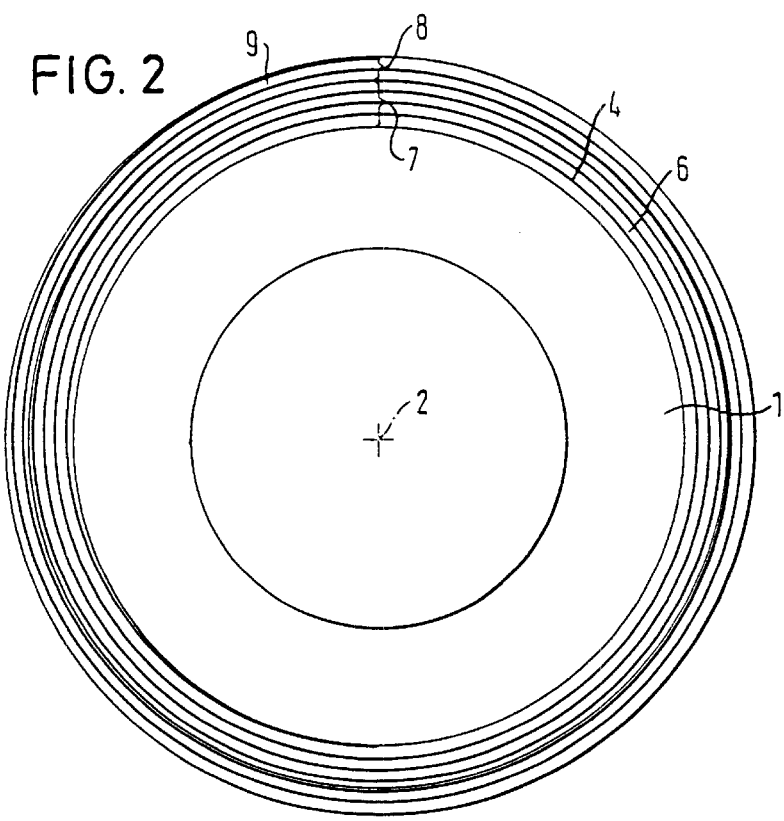
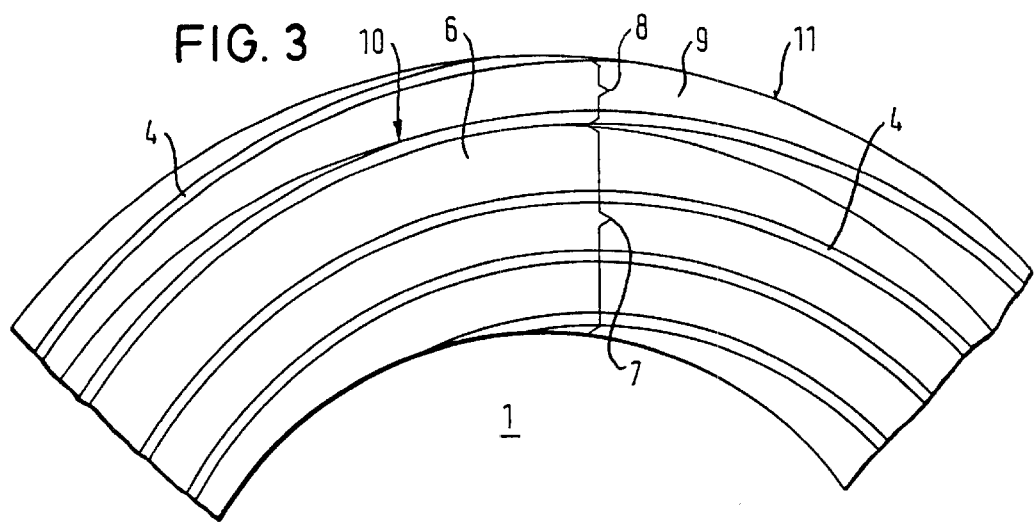

RESILIENT ROLL FOR SMOOTHING WEBS

CROSS-REFERENCE TO RELATED APPLICATIONS

The present application claims priority under 35 U.S.C. § 119 of German Patent Application No. 199 25 419.2, filed on Jun. 2, 1999, the disclosure of which is expressly incorporated by reference herein in its entirety.

BACKGROUND OF THE INVENTION

1. Field of the Invention

The present invention relates to a roll, e.g., for smoothing paper webs, having a hard roll core which includes, e.g., metal, and which is provided on its outer side with a resilient covering layer including a resilient matrix material, and a metallic top layer provided on the outside of the resilient covering layer. Furthermore, the invention is directed to a process for producing such a roll.

2. Background of the Invention

Resilient rolls of this type are used, for example, in the calendering of paper webs. Here, in each case an elastic roll together with a hard roll forms a press nip, through which the paper web to be processed is led. While the hard roll has a very smooth surface, made of, e.g., steel or hard cast iron, and is responsible for smoothing that side of the paper web which faces it, the resilient roll acting on the opposite side of the paper web has the effect of evening and compacting the paper web in the press nip. The rolls have lengths on the order of approximately 3 to 12 m and diameters on the order of approximately 450 to 1500 mm. They withstand line forces up to approximately 600 N/mm and compressive stresses up to approximately 130 N/mm$^2$.

Since the tendency in paper manufacture is for calendering to be carried out on-line, that is to say the paper web leaving the papermaking machine or coating machine is led immediately through the paper smoothing device (calender), higher requirements than hitherto are placed on the rolls of the smoothing device, in particular in relation to their temperature resistance. The high transport speeds of the paper web, necessitated by on-line operation, and the associated high rotational speeds of the calender rolls, increase the nip frequency of the rolls, i.e., the frequency with which the cover is compressed and relieved again, which in turn leads to increased roll temperatures. These high temperatures, produced during on-line operation, lead to problems which, in the case of known resilient rolls, can lead to the destruction of the synthetic covering. On the one hand, in the case of known synthetic coverings, maximum temperature differences of about 20° C. over the width of the roll are permissible and, on the other hand, the polymers normally used for the coating have a significantly higher coefficient of thermal expansion than the steel rolls or hard cast rolls normally used, so that, as a result of an increase in the temperature, high axial stresses occur between the steel roll or hard cast roll and the synthetic coating connected to it.

As a result of these high stresses, associated with heating locations, which occur in particular at certain points, within the synthetic coating, so-called hot spots can occur, at which separation or even bursting of the synthetic layer takes place.

These hot spots occur in particular when, in addition to the mechanical stresses and the relatively high temperature, there are crystallization points in the form of, e.g., faulty adhesive bonds, deposits or above-average indentations in the resilient covering, e.g., as a result of creases in or foreign bodies on the paper web. In these cases, the temperature at these crystallization points can rise from normally approximately 80° C. to 90° C. to more than approximately 150° C., which results in the aforementioned destruction of the synthetic layer.

A roll whose resilient covering layer is provided with an additional metal coating is disclosed by DE-A-4126232. Via the metallic top layer, the thermal conductivity of the outside of the roll is increased, so that undesired heat occurring within the press nip can be dissipated rapidly, and the temperature during the treatment of the material web can essentially be kept constant.

The problem with a metallic covering layer is that the resilience of the surface of the roll decreases as a function of the thickness of the metallic covering layer. If the metallic top layer is selected to be too thick, the resilience of the surface of the roll becomes so low that the calendering result suffers under this. Furthermore, the application of an appropriately thin metal layer is relatively complicated, and it is difficult to distribute a metal layer of the desired low thickness uniformly over the entire roll surface. Furthermore, the connection between the resilient covering layer and the metallic top layer is inadequate in many cases, so that separation of the metallic top layer can occur during operation.

SUMMARY OF THE INVENTION

The present invention provides a roll of the type mentioned above which also has a good thermal conductivity at least at its surface. In this way, the metallic top layer can be simply and cost-effectively produced and can be reliably connected to the resilient covering layer underneath. In addition, a process for producing such a roll is to be specified.

According to the invention, the roll can be similar in general to the roll disclosed above that also includes a metallic top layer that includes metal fibers and/or metal-coated fibers. A corresponding process according to the invention, in order to produce the metallic top layer, includes winding a large number of metal fibers and/or of metal-coated fibers onto the resilient covering layer.

As a result of the use of metal fibers or metal-coated fibers for forming the metallic top layer, a very thin top layer can be produced and, if metal-coated fibers and a suitable fiber material are used, the top layer can have a higher resilience than a top layer made of pure metal. Via the metallic top layer, good thermal conductivity of the surface of the roll is achieved, so that the heat occurring within the press nip during operation can be dissipated rapidly to the outside. This ensures that the temperature during the treatment of the material web in the press nip can be essentially kept constant.

Furthermore, by radially inwardly projecting fibers, i.e., from the metallic top layer into the resilient covering layer, the connection between the metallic top layer and the resilient covering layer can be improved. In this manner, separation of the top layer during operation can be largely ruled out.

According to an advantageous embodiment of the invention, the fibers are combined into one or more fiber bundles and/or fiber rovings and/or fiber non-wovens. In particular, when forming the metallic top layer with metal-coated fiber rovings or those including metal, which essentially have of a large number of fibers lying beside one another in a single ply, a very thin metal layer with a high flexibility is produced.

The metallic top layer can preferably have a radial thickness between about 2 μm and 30 μm, and preferably between about 5 μm and 10 μm.

The surface of the metallic top layer is preferably ground and, in particular, polished, to create the smoothest possible roll surface for producing high-quality paper. In this case, the surface of the metal top layer can have an $R^a$ value less than approximately 0.05 μm, and in particular less than approximately 0.03 μm.

According to a preferred embodiment of the invention, the metal of the top layer is a metal which melts at low temperatures, e.g., at temperatures below about 600° C., preferably at about 480° C. or less, such as zirconium. As a result of using a low-melting-point metal, the production of a roll designed in accordance with the invention is simplified, since both the fiber material and the matrix material need to have a lower resistance to heat than if a metal melting at high temperatures were to be used. The use of zirconium is advantageous, since zirconium enters into a particularly good connection with the plastic materials normally used to form the resilient covering layer. As a result, the connection between the resilient covering layer and the metallic top layer is further improved.

It is advantageous for fillers, which preferably have a greater stiffness than the matrix material, to be embedded in the matrix material, such that the necessary stiffness of the resilient covering layer is achieved. It is also advantageous for the thermal conductivity of the fillers to be higher than the thermal conductivity of the matrix material. This means that the heat at overheating points occurring within the resilient-covering layer can be completely dissipated rapidly, for example to the roll core or to the metallic top layer, and laterally from there in each case.

It is advantageous for the coefficient of thermal expansion of the fillers to be lower than the coefficient of thermal expansion of the matrix material and, in particular, to be essentially as high as the coefficient of thermal expansion of the roll core. in this way, it is possible to adjust the overall coefficient of thermal expansion of the resilient covering layer to be lower than the coefficient of thermal expansion of the matrix material, so that the longitudinal stresses between the roll core and the resilient covering layer, which occur as a result of the heating during operation, can be reduced or completely compensated for. To this end, it is advantageous for the fillers to include carbon and/or glass and/or metal.

According to a preferred embodiment of the invention, the fillers are formed as fibers, e.g., fiber bundles and/or fiber rovings and/or a fiber non-woven. In this case it is advantageous for at least some of the fibers to be formed from the same material as the fibers of the metallic top layer and, in particular, for the fibers of the metallic top layer and the fibers embedded in the matrix material to be, at least to some extent, fibers of the same fiber bundle, fiber roving and/or fiber non-woven. If both the resilient covering layer and the metallic top layer are essentially formed by the same fiber bundles, fiber rovings or fiber non-wovens, then the resilient covering layer and the metallic top layer have a unified, continuous reinforcement formed by the fibers. Detachment of the metallic top layer from the resilient covering layer can be virtually ruled out in this way.

In order to produce a resilient roll, according to the invention a large number of metal fibers and/or of metal-coated fibers is wound onto the resilient covering layer. In this case, the fibers can be wound onto the covering layer in the form of one or more fiber bundles, fiber rovings or fiber non-wovens, an essentially single-ply fiber layer being wound on, in particular, to produce the thinnest possible resilient metallic top layer. Before being wound onto the resilient covering layer, the fibers are preferably coated with metal, e.g., drawn through a bath of metal, or essentially wound dry onto the covering layer and, during or after the winding operation, are coated with the metal or have the metal applied to them, e.g., in liquid form.

In a similar way, in order to produce the resilient covering layer, fibers impregnated with liquid matrix material, e.g., fibers in the form of one or more fiber bundles and/or fiber rovings and/or fiber non-wovens, are wound onto the roll core. In this case, before being wound onto the roll core, the fibers can be coated with the matrix material, e.g., drawn through a bath of matrix. However, it is also possible for the fibers to be wound essentially dry onto the roll core and, during or after the winding operation, to be coated with the matrix material or have the matrix material applied to them, e.g., in liquid form.

If, advantageously, the resilient covering layer and the metallic top layer are formed by the same fiber bundles and/or fiber wovings and/or fiber non-wovens, a roll constructed in accordance with the invention can be produced particularly simply by means of a single winding operation. In this case, the fibers can be initially drawn through a bath of matrix to produce the resilient covering layer and can be wound onto the roll core until the resilient covering layer has reached the desired thickness. The same fibers can then be wound further onto the resilient covering layer just produced, being guided previously through a bath of metal. Since in this case the resilient covering layer and the metallic top layer includes the same fiber bundles, detachment of the metallic top layer from the resilient covering layer can be virtually ruled out.

After the application of the metal fibers and/or metal-coated fibers to the covering layer, the surface of the metallic top layer may be ground and, preferably, polished, until the desired surface quality of the resilient roll is achieved.

The instant invention is directed to a roll that includes hard roll core, a resilient covering layer located on an outer side of said hard roll core, and a metallic top layer located on an outside of said resilient covering layer. The metallic top layer includes fibers that include at least one of metal fibers and metal-coated fibers.

In accordance with a feature of the instant invention, the roll can be adapted for smoothing paper webs, the hard roll core can include metal, and the resilient covering layer can include a resilient matrix material.

According to another feature of the present invention, the fibers can be combined into at least one of at least one fiber bundle, at least one fiber roving and at least one fiber non-woven.

According to another feature of the invention, the metallic top layer can include an essentially single-ply fiber layer.

Further, the metallic top layer can have a radial thickness between about 2 μm and 30 μm, and, preferably, the radial thickness can be between about 5 μm and 10 μm.

A surface of the metallic top layer can be ground. Further, the surface may be polished.

A surface of the metallic top layer may have an $R^a$ value less than approximately 0.05 μm, preferably, the $R^a$ value can be less than approximately 0.03 μm.

Moreover, a metal of the metallic top layer can melt at temperatures below about 600° C., preferably, the metal melts at temperatures about 480° C. or less, and the metal can include zirconium.

In a further feature of the instant invention, the resilient covering layer can include a resilient matrix material with fillers embedded therein. The fillers may have a greater stiffness than the resilient matrix material. Further, a thermal conductivity of the fillers may be higher than a thermal conductivity of the resilient matrix material. Moreover, a coefficient of thermal expansion of the fillers may be lower than a coefficient of thermal expansion of the resilient matrix material. The coefficient of thermal expansion of the fillers can be essentially as high as a coefficient of thermal expansion of the hard roll core. Still further, the fillers can include at least one of carbon, glass and metal.

Further still, fillers can be formed as filler fibers, and the filler fibers can be formed as at least one of at least one fiber bundle, at least one fiber roving, and at least one fiber non-woven. At least some of the filler fibers may be formed from a same material as the fibers of the metallic top layer. The fibers of the metallic top layer and the filler fibers can be fibers of same at least one of a fiber bundle, fiber roving and fiber non-woven.

At least some of at least one of the fibers and the filler fibers can be aligned in an axial direction. In particular, a predominant portion of the at least one of the fibers and the filler fibers can be aligned in the axial direction.

At least some of at least one of the fibers and the filler fibers can be aligned in a radial direction. In particular, a predominant portion of the at least one of the fibers and the filler fibers are aligned in the radial direction.

At least some of at least one of the fibers and the filler fibers can be randomly aligned.

In accordance with a still further feature of the invention, at least one of the fibers and the filler fibers can be arranged in one of one fiber layer and in radially successive fiber layers.

According to still another feature of the present invention, the resilient matrix material can further include additional fillers comprising at least one of fibers and powder. The additional fillers can include at least one of quartz and PTFE.

The resilient matrix material can include a polymer. Further, the polymer can include one of a thermosetting polymer and a thermoplastic polymer.

According to another feature of the instant invention, the resilient matrix material can include a resin/hardener combination.

The present invention is also directed to a process for producing a roll having a hard roll core. The process includes applying a resilient covering layer onto an outer side of the hard roll core, and winding a metallic top layer comprising a plurality of fibers of at least one of metal fibers and metal-coated fibers onto an outside of the resilient covering layer.

In accordance with a feature of the invention, the hard roll core can be metal, and the resilient covering layer can include a resilient matrix material.

According to another feature of the instant invention, the fibers can be wound onto the resilient covering layer in the form of at least one of at least one fiber bundle, at least one fiber roving, and at least one fiber non-woven. After the resilient covering layer has been formed, a same at least one fiber bundle, at least one fiber roving, and at least one fiber non-wovens are used to produce the metallic top layer.

In accordance with still another feature of the present invention, a roving can include a large number of fibers of an identical type lying beside one another.

According to still another feature of the invention, the metallic top layer can include a wound essentially single-ply fiber layer.

Before being wound onto the resilient covering layer, the process can further include coating the fibers with metal. The coating of the fibers with metal can include drawing the fibers through a bath of metal.

Further, the fibers can be essentially wound dry onto the resilient covering layer and, during or after the winding, can be one of are coated with a metal and have the metal applied to them in a liquid form.

The process can further include producing the resilient covering layer by winding covering layer fibers impregnated with liquid matrix material onto the hard roll core. The covering layer fibers may be formed as at least one of at least one fiber bundle, at least one fiber roving, and a least one fiber non-wovens. Before being wound onto the hard roll core, the cover layer fibers may be coated with the matrix material. Further, the cover layer fibers can be coated by being drawn through a bath of matrix. Moreover, the cover layer fibers can be essentially wound dry onto the hard roll core and, during or after the winding operation, can be one of are coated with the matrix material and have the matrix material applied to them in liquid form.

According to another feature of the instant invention, the fibers may include soft synthetic fibers. The soft synthetic fibers can include at least one of aramide and carbon fibers.

In accordance with a further feature of the instant invention, after the application of the at least one of metal fibers and metal-coated fibers to the resilient covering layer, the process can include grinding a surface of the metallic top layer. Still further, the process can include polishing the surface.

According to yet another feature of the instant invention, the resilient covering layer can include a resilient matrix material and fillers embedded in the resilient matrix material, and the fillers can include at least one of fibers and powder. The filler may include at least one of carbon and glass.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 schematically illustrates a resilient roll constructed in a accordance with the invention during the production of the resilient covering layer;

FIG. 2 schematically illustrates a cross section through the roll depicted in FIG. 1 with a complete resilient and metallic coating; and FIG. 3 illustrates a detail view of FIG. 2.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A roll, as illustrated in FIG. 1, comprises a hard roll core 1, e.g., steel or hard cast iron, which is mounted for rotation about an axis 2. A large number of fibers 3, which are combined into a fiber bundle 4, are wound onto the outside of roll core 1, as shown in FIG. 1. Before being wound onto roll core 1, fiber bundle 4 is guided through an impregnation device 5 (schematically depicted), where it is coated with liquid matrix material 6.

A sufficient number of layers of fiber bundles 4 are wound onto roll core 1 until a resilient covering layer 7 (see FIGS. 2 and 3) of a desired thickness has been produced. In the process, either one fiber bundle 4 is wound many times, or a number of separate fibers bundles 4 are wound once or many times around roll core 1.

Fiber bundle 4 continues to be wound onto completely formed resilient covering layer 7. However, instead of a liquid matrix material, fibers 3 of fiber bundle 4 are coated with liquid metal either in impregnation device 5 or in another impregnation device before being wound on. In this way, a metallic top layer 8 (see FIGS. 2 and 3) is produced on resilient covering layer 7, and advantageously includes a single fiber layer or at least a low number of fiber layers with a metal coating. If fibers 3 are already formed as metal fibers, then, in order to produce top layer 8, they can be heated to such an extent that they begin to melt, at least in the surface area. In this way, the metal fibers can fuse together and, following the winding operation, a homogeneous metallic top layer 8 is produced. In principle, it is also possible for the metal fibers to be heated only after the winding operation to such an extent that their surface begins to melt, by which the homogeneous top layer is produced.

It can be seen from FIG. 2, and in particular from the detail view according to FIG. 3, that metallic top layer 8 is essentially formed of a fiber layer which is formed by fiber bundle 4 and which is coated with metal 9 or embedded in this metal. Accordingly, the resilient covering layer 7 is built up from a large number of spirally arranged fiber layers which are formed by fiber bundle 4 and are embedded in matrix material 6.

The size and thickness relationships are not shown to scale in FIGS. 2 and 3, since in the case of an actual thickness of the metallic top layer of, e.g., approximately 10 $\mu$m, it would not be possible to see this in the figures.

As shown in FIG. 3, both metallic top layer 8 and resilient covering layer 7 have utilize fiber bundle 4 as the carrier for metal 9 and matrix material 6, respectively. Further, fiber bundle 4 emerges from resilient covering layer 7 at a point designated by reference numeral 10 and enter metallic top layer 8. Resilient covering layer 7 and metallic top layer 8 thus have a unified construction as a result of fiber bundle 4, so that they are securely connected to each other via fiber bundle 4.

After metallic top layer 8 has been completely formed, its surface 11 is ground and, if necessary, polished, so that surface 11 of the roll according to the invention is extremely smooth.

The single-ply fiber layer formed by fiber bundle 4 in metallic top layer 8 gives the latter a very stable construction and, at the same time, if suitable fiber materials are used, allows high flexibility of metallic top layer 8. In this manner, despite metallic top layer 8, the coating of the roll constructed in accordance with the invention has a high flexibility.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE SYMBOLS

1 Roll core
2 Axis
3 Fibers
4 Fiber bundle
5 Impregnation device
6 Matrix material
7 Resilient covering layer
8 Metallic top layer
9 Metal
10 Transition point
11 Surface

What is claimed is:

1. A roll comprising:

hard roll core;

a resilient covering layer located on an outer side of said hard roll core;

a metallic top layer located on an outside of said resilient covering layer;

said metallic top layer comprising fibers that include at least one of metal fibers and metal-coated fibers; and said metallic top layer having a smooth surface adapted for smoothing a paper web.

2. The roll in accordance with claim 1, wherein said hard roll core comprises metal, and wherein said resilient covering layer comprises a resilient matrix material.

3. The roll in accordance with claim 1, wherein said fibers are combined into at least one of at least one fiber bundle, at least one fiber roving and at least one fiber non-woven.

4. The roll in accordance with claim 1, wherein said metallic top layer comprises an essentially single-ply fiber layer.

5. The roll in accordance with claim 1, wherein said metallic top layer has a radial thickness between about 2 $\mu$m and 30 $\mu$m.

6. The roll in accordance with claim 5, wherein said radial thickness is between about 5 $\mu$m and 10 $\mu$m.

7. The roll in accordance with claim 1, wherein a surface of said metallic top layer is ground.

8. The roll in accordance with claim 7, wherein said surface is polished.

9. The roll in accordance with claim 1, wherein a surface of said metallic top layer has an $R^a$ value less than approximately 0.05 $\mu$m.

10. The roll in accordance with claim 9, wherein said Rvalue is less than approximately 0.03 $\mu$m.

11. The roll in accordance with claim 1, wherein a metal of said metallic top layer melts at temperatures below about 600° C.

12. The roll in accordance with claim 11, wherein said metal melts at temperatures about 480° C. or less, and wherein said metal comprises zirconium.

13. The roll in accordance with claim 1, wherein said resilient covering layer comprises a resilient matrix material with fillers embedded therein.

14. The roll in accordance with claim 13, wherein said fillers have a greater stiffness than said resilient matrix material.

15. The roll in accordance with claim 13, wherein a thermal conductivity of said fillers is higher than a thermal conductivity of said resilient matrix material.

16. The roll in accordance with claim 13, wherein a coefficient of thermal expansion of said fillers is lower than a coefficient of thermal expansion of said resilient matrix material.

17. The roll in accordance with claim 16, wherein said coefficient of thermal expansion of said fillers is essentially as high as a coefficient of thermal expansion of said hard roll core.

18. The roll in accordance with claim 13, wherein said fillers comprise at least one of carbon, glass and metal.

19. The roll in accordance with claim 13, wherein said fillers are formed as filler fibers.

20. The roll in accordance with claim 19, wherein said filler fibers are form as at least one of at least one fiber bundle, at least one fiber roving, and at least one fiber non-woven.

21. The roll in accordance with claim 20, wherein at least some of said filler fibers are formed from a same material as said fibers of said metallic top layer.

22. The roll in accordance with claim 20, wherein said fibers of said metallic top layer and said filler fibers are fibers of same at least one of a fiber bundle, fiber roving and fiber non-woven.

23. The roll in accordance with claim 20, wherein at least some of at least one of said fibers and said filler fibers are aligned in an axial direction.

24. The roll in accordance with claim 23, wherein a predominant portion of said at least one of said fibers and said filler fibers are aligned in the axial direction.

25. The roll in accordance with claim 20, wherein at least some of at least one of said fibers and said filler fibers are aligned in a radial direction.

26. The roll in accordance with claim 25, wherein a predominant portion of said at least one of said fibers and said filler fibers are aligned in the radial direction.

27. The roll in accordance with claim 20, wherein at least some of at least one of said fibers and said filler fibers are distributed randomly.

28. The roll in accordance with claim 20, wherein at least one of said fibers and said filler fibers are arranged in one of one fiber layer and in radially successive fiber layers.

29. The roll in accordance with claim 13, wherein said resilient matrix material further comprises additional fillers comprising at least one of fibers and powder.

30. The roll in accordance with claim 29, wherein said additional fillers comprise at least one of quartz and PTFE.

31. The roll in accordance with claim 1, wherein said resilient matrix material comprises a polymer.

32. The roll in accordance with claim 31, wherein said polymer comprises one of a thermosetting polymer and a thermoplastic polymer.

33. The roll in accordance with claim 1, wherein said resilient matrix material comprises a resin/hardener combination.

* * * * *